United States Patent [19]
Hüffer et al.

[11] Patent Number: 6,013,742
[45] Date of Patent: Jan. 11, 2000

[54] PROCESS FOR PRODUCING IMPROVED RANDOM PROPYLENE COPOLYMERS

[75] Inventors: Stephan Hüffer, Ludwigshafen; Meinolf Kersting, Neustadt; Franz Langhauser; Rainer Alexander Werner, both of Bad Bükheim; Patrik Müller, Kaiserslautern; Jürgen Kerth, Carlsberg, all of Germany

[73] Assignee: BASF Aktiengesellschaft, Ludwigshafen, Germany

[21] Appl. No.: 08/969,278

[22] Filed: Nov. 13, 1997

Related U.S. Application Data

[62] Division of application No. 08/763,839, Dec. 4, 1996, Pat. No. 5,744,567.

Foreign Application Priority Data

Dec. 6, 1995 [DE] Germany .................... 195 45 499

[51] Int. Cl.$^7$ ..................................... C08F 4/18
[52] U.S. Cl. .................... 526/124.5; 526/128; 526/129; 526/348.6; 502/120; 502/127
[58] Field of Search .............................. 526/124.5, 129, 526/348.6, 128

[56] References Cited

U.S. PATENT DOCUMENTS 5,618,895  4/1997  Kerth et al. ........................ 526/128

*Primary Examiner*—David W. Wu
*Attorney, Agent, or Firm*—Keil & Weinkauf

[57] ABSTRACT

A process for preparing random propylene copolymers containing copolymerized $C_2$–$C_{10}$-alk-1-enes by polymerization of propylene and $C_2$–$C_{10}$-alk-1-enes in the presence of a Ziegler-Natta catalyst system comprising a titanium-containing solid component a) comprising a compound of magnesium, a halogen, silica gel as support and a carboxylic ester as electron donor compound, and also, as cocatalysts, an aluminum compound b) and a further electron donor compound c), where propylene and the $C_2$–$C_{10}$-alk-1-enes are polymerized with one another at from 50 to 100° C. at pressures in the range from 15 to 40 bar and mean residence times of from 0.5 to 5 hours and the support used in the titanium-containing solid component is a silica gel which has a mean particle diameter of from 5 to 200 μm, a mean particle diameter of the primary particles of from 1 to 10 μm and voids or channels having a mean diameter of from 1 to 10 μm, which voids or channels have a macroscopic proportion by volume based on the total particle in the range from 5 to 20%.

4 Claims, No Drawings

PROCESS FOR PRODUCING IMPROVED RANDOM PROPYLENE COPOLYMERS

This is a divisional of Ser. No. 08/763,839, filed on Dec. 4, 1996, now U.S. Pat. No. 5,744,567, issued on Apr. 28, 1998.

BACKGROUND OF THE INVENTION

The present invention relates to random propylene copolymers containing copolymerized $C_2$–$C_{10}$-alk-1-enes obtainable by polymerization of propylene and $C_2$–$C_{10}$-alk-1-enes in the presence of a Ziegler-Natta catalyst system comprising a titanium-containing solid component a) comprising a compound of magnesium, a halogen, silica gel as support and a carboxylic ester as electron donor compound, and also, as cocatalysts, an aluminum compound b) and a further electron donor compound c), where propylene and the $C_2$–$C_{10}$-alk-1-enes are polymerized with one another at from 50 to 100° C. at pressures in the range from 15 to 40 bar and mean residence times of from 0.5 to 5 hours and the support used in the titanium-containing solid component is a silica gel which has a mean particle diameter of from 5 to 200 μm, a mean particle diameter of the primary particles of from 1 to 10 μm and voids or channels having a mean diameter of from 1 to 10 μm, which voids or channels have a macroscopic proportion by volume based on the total particle in the range from 5 to 20%.

In addition, the present invention relates to a process for preparing such random propylene copolymers and their use as films, fibers and moldings.

Catalyst systems of the Ziegler-Natta type are known, for example, from EP-B 014523, EP-A 023425, EP-A 045975 and EP-A 195497. These systems are used, in particular, for the polymerization of $C_2$–$C_{10}$-alk-1-enes and contain, inter alia, compounds of polyvalent titanium, aluminum halides and/or aluminum alkyls, and also electron donor compounds, in particular silicon compounds, ethers, carboxylic esters, ketones and lactones which are used both in connection with the titanium component and also as cocatalyst.

The Ziegler-Natta catalysts are customarily prepared in two steps. The titanium-containing solid component is prepared first and subsequently reacted with the cocatalyst. The polymerization is then carried out by means of the catalysts thus obtained.

Furthermore, U.S. Pat. No. 4,857,613 and U.S. Pat. No. 5,288,824 describe catalyst systems of the Ziegler-Natta type comprising not only a titanium-containing solid component and an aluminum compound but also organic silane compounds as external electron donor compounds. The catalyst systems thus obtained have a good productivity and give polymers of propylene having a high stereospecificity, ie. a high isotacticity, a low chlorine content and a good morphology, ie. a low fines content.

For some applications of propylene polymers, it is necessary for these to have a high stiffness and only a small proportion of xylene-soluble polymer particles. This is the case, for example, for food films produced from such propylene polymers.

The propylene polymers known from U.S. Pat. No. 4,857,613 and U.S. Pat. No. 5,288,824 do not meet these requirements to a sufficient extent.

BRIEF SUMMARY OF THE INVENTION

It is an object of the present invention to develop, starting from the propylene polymers described in U.S. Pat. No. 4,857,613 and U.S. Pat. No. 5,288,824, further improved propylene polymers which do not have the abovementioned disadvantages.

We have found that this object is achieved by the random propylene copolymers defined in the introduction.

DETAILED DESCRIPTION OF THE INVENTION

The random propylene copolymers of the present invention are obtainable by polymerization in the presence of a Ziegler-Natta catalyst system comprising a titanium-containing solid component a) comprising a compound of magnesium, a halogen, silica gel as support and a carboxylic ester as electron donor compound, and also, as cocatalysts, an aluminum compound b) and a further electron donor compound c).

Titanium compounds used for preparing the titanium-containing solid component a) are generally halides or alkoxides of trivalent or tetravalent titanium, with the chlorides of titanium, particularly titanium tetrachloride, being preferred. The titanium-containing solid component additionally contains silica gel as support.

Compounds of magnesium are also used, inter alia, in the preparation of the titanium-containing solid component. Suitable magnesium compounds are, in particular, magnesium halides, magnesium alkyls and magnesium aryls, and also magnesium alkoxy and magnesium aryloxy compounds, with preference being given to using magnesium dichloride, magnesium dibromide and di($C_1$–$C_{10}$-alkyl)magnesium compounds. In addition, the titanium-containing solid component can contain additional halogen, preferably chlorine or bromine.

The titanium-containing solid component a) additionally contains electron donor compounds, for example monofunctional or polyfunctional carboxylic acids, carboxylic anhydrides and carboxylic esters, also ketones, ethers, alcohols, lactones, or organophosphorus and organosilicon compounds. As electron donor compounds within the titanium-containing solid component, preference is given to using phthalic acid derivatives of the general formula (II)

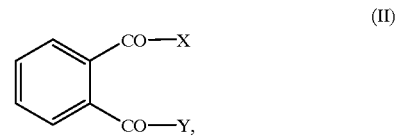

(II)

where X and Y are each a chlorine atom or a $C_1$–$C_{10}$-alkoxy radical or together are oxygen. Particularly preferred electron donor compounds are phthalic esters where X and Y are each a $C_1$–$C_8$-alkoxy radical, for example a methoxy, ethoxy, propyloxy or butyloxy radical.

Further preferred electron donor compounds within the titanium-containing solid component are, inter alia, diesters of 3- or 4-membered, unsubstituted or substituted cycloalkyl-1,2-dicarboxylic acids, and also monoesters of unsubstituted or substituted benzophenone-2-carboxylic acids. The hydroxy compounds used for forming these esters are the alcohols customary in esterification reactions, for example $C_1$–$C_{15}$-alkanols, $C_5$–$C_7$-cycloalkanols, which can in turn bear $C_1$–$C_{10}$-alkyl groups, also $C_6$–$C_{10}$-phenols.

The titanium-containing solid component can be prepared by methods known per se. Examples of such methods are described, inter alia, in EP-A 45 975, EP-A 45 977, EP-A 86 473, EP-A 171 200, GB-A 2 111 066, U.S. Pat. No. 4,857,613 and U.S. Pat. No. 5,288,824.

In the preparation of the titanium-containing solid component a), the following two-stage process is preferably employed:

In the first stage, silica gel ($SiO_2$) as finely divided support, which generally has a mean particle diameter of from 5 to 200 μm, in particular from 20 to 70 μm, a pore volume of from 0.1 to 10 cm³/g, in particular from 1.0 to 4.0 cm³/g, and a specific surface area of from 10 to 1000 m²/g, in particular from 100 to 500 m²/g, is first reacted with a solution of the magnesium-containing compound in a liquid alkane, after which this mixture is stirred for from 0.5 to 5 hours at from 10 to 120° C. Preferably, from 0.1 to 1 mol of the magnesium compound is used per mole of the support. Subsequently, a halogen or a hydrogen halide, in particular chlorine or hydrogen chloride, in an at least two-fold, preferably at least five-fold, molar excess based on the magnesium-containing compound is added while stirring continually. After about 30–120 minutes, this reaction product is admixed at from 10 to 150° C. with a $C_1$–$C_8$-alkanol, in particular ethanol, a halide or an alkoxide of trivalent or tetravalent titanium, in particular titanium tetrachloride, and also an electron donor compound. Here, from 1 to 5 mol of the trivalent or tetravalent titanium and from 0.01 to 1 mol, in particular from 0.2 to 0.6 mol, of the electron donor compound are used per mole of magnesium in the solid obtained from the first stage. This mixture is stirred for at least 30 minutes at from 10 to 150° C., the solid thus obtained is subsequently filtered off and washed with a $C_7$–$C_{10}$-alkylbenzene, preferably with ethylbenzene.

In the second stage, the solid obtained from the first stage is extracted for at least one hour at from 100 to 150° C. with excess titanium tetrachloride or an excess of a solution of titanium tetrachloride in an inert solvent, preferably an alkylbenzene, with the solvent containing at least 5% by weight of titanium tetrachloride. The product is then washed with a liquid alkane until the titanium tetrachloride content of the washings is less than 2% by weight.

The titanium-containing solid component obtainable in this way is used together with a cocatalyst as Ziegler-Natta catalyst system. An example of a suitable cocatalyst is an aluminum compound b).

Aluminum compounds b) suitable as cocatalysts are trialkylaluminum and also such compounds in which an alkyl group is replaced by an alkoxy group or by a halogen atom, for example by chlorine or bromine. Preference is given to using trialkylaluminum compounds whose alkyl groups each have from 1 to 8 carbon atoms, for example trimethylaluminum, triethylaluminum or methyldiethylaluminum.

Preferably, use is made not only of the aluminum compound b) but also, as further cocatalyst, electron donor compounds c) such as, for example, monofunctional or polyfunctional carboxylic acids, carboxylic anhydrides and carboxylic esters, also ketones, ethers, alcohols, lactones, or organophosphorus and organosilicon compounds. Preferred electron donor compounds are here organosilicon compounds of the general formula (I)

$$R^1{}_n Si(OR^2)_{4-n} \quad (I)$$

where $R^1$ are identical or different and are each a $C_1$–$C_{20}$-alkyl group, a 5- to 7-membered cycloalkyl group which in turn can bear a $C_1$–$C_{10}$-alkyl group, or a $C_6$–$C_{20}$-aryl or arylalkyl group, $R^2$ are identical or different and are each a $C_1$–$C_{20}$-alkyl group and n is 1, 2 or 3. Particular preference is here given to those compounds in which $R^1$ is a $C_1$–$C_8$-alkyl group or a 5- to 7-membered cycloalkyl group, and $R^2$ is a $C_1$–$C_4$-alkyl group and n is 1 or 2.

Among these compounds, particular emphasis may be given to dimethoxydiisopropylsilane, dimethoxyisobutylisopropylsilane, dimethoxydiisobutylsilane, dimethoxydicyclopentylsilane, dimethoxyisobutylsec-butylsilane, dimethoxyisopropylsec-butylsilane, diethoxydicyclopentylsilane and diethoxyisobutylisopropylsilane.

The individual compounds b) and, if desired, c) can be used as cocatalyst either individually in any order or as a mixture of two components.

According to the present invention, the silica gel used in the titanium-containing solid component a) is a finely divided silica gel having a mean particle diameter of from 5 to 200 μm, in particular from 20 to 70 μm, and a mean particle diameter of the primary particles of from 1 to 10 μm, in particular from 1 to 5 μm. The primary particles mentioned here are porous, granular silica gel particles which are obtained from an $SiO_2$ hydrogel by milling, possibly after appropriate sieving.

Furthermore, the finely divided silica gel to be used according to the present invention also has voids or channels having a mean diameter of from 1 to 10 μm, in particular from 1 to 5 μm, which voids or channels have a macroscopic proportion by volume based on the total particle in the range from 5 to 20%, in particular in the range from 5 to 15%. The finely divided silica gel also has, in particular, a pore volume of from 0.1 to 10 cm³/g, preferably from 1.0 to 4.0 cm³/g, and a specific surface area of from 10 to 1000 m²/g, preferably from 100 to 500 m²/g.

Owing to the voids or channels present in the finely divided silica gel, there is a significantly improved distribution of the active catalyst components in the support material. In addition, a material containing such voids and channels has a positive effect on the diffusion-controlled supply of monomers and cocatalysts and thus also on the polymerization kinetics. Such a finely divided silica gel is obtainable, inter alia, by spray drying milled, appropriately sieved $SiO_2$ hydrogel, which for this purpose is mixed to a paste with water or an aliphatic alcohol. However, such a finely divided silica gel is also commercially available.

The silica gel is preferably present in the titanium-containing solid component a) in such amounts that from 0.1 to 1.0 mol, in particular from 0.2 to 0.5 mol, of the magnesium compound is present per 1 mol of the silica gel.

The cocatalytic compounds b) and c) can be allowed to act on the titanium-containing solid component a) either successively or together. This is usually done at from 0 to 150° C., in particular from 20 to 90° C., and at pressures of from 1 to 100 bar, in particular from 1 to 40 bar.

The cocatalysts b) and c) are preferably used in such an amount that the atomic ratio of aluminum from the aluminum compound to titanium from the titanium-containing solid component a) is from 10:1 to 800:1, in particular from 20:1 to 200:1, and the molar ratio of the aluminum compound to the electron donor compound c) used as cocatalyst is from 1:1 to 250:1, in particular from 10:1 to 80:1.

The preparation of the random propylene copolymers of the present invention can be carried out in the customary reactors used for the polymerization of $C_2$–$C_{10}$-alk-1-enes either batchwise or preferably continuously, for example as a suspension polymerization or preferably as a gas-phase polymerization. Suitable reactors include continuously operated stirred reactors containing a fixed bed of finely divided polymer which is customarily kept in motion by suitable stirring equipment. Of course, the reaction can also be carried out in a plurality of reactors connected in series.

The process leading to the random propylene copolymers of the present invention, which process is likewise subject matter of the present invention, is carried out by polymerizing propylene together with the $C_2$–$C_{10}$-alk-1-enes at from 50 to 100° C., pressures in the range from 15 to 40 bar and mean residence times of from 0.5 to 5 hours. Preference is given to temperatures of from 60° to 90° C., pressures of from 20 to 35 bar and mean residence times of from 0.5 to 3 hours.

The comonomers propylene and the $C_2$–$C_{10}$-alk-1-ene(s) are here usually used in such amounts that the partial pressure ratio of propylene to the $C_2$–$C_{10}$-alk-1-ene(s) is from 2:1 to 100:1, in particular from 5:1 to 80:1. The term $C_2$–$C_{10}$-alk-1-enes here means, in particular, ethylene, 1-butene, 1-pentene, 1-hexene, 1-heptene or 1-octene or mixtures of these, with preference being given to using ethylene, 1-butene or mixtures of ethylene and 1-butene. If a mixture of ethylene and 1-butene is used as $C_2$–$C_{10}$-alk-1-ene, the partial pressure ratio of propylene, ethylene and 1-butene should be maintained in the range from 2:0.5:1 to 100:50:1, in particular in the range from 5:1:1 to 80:20:1.

The molecular weight of the random propylene copolymers can be controlled and adjusted over a wide range by addition of regulators customary in polymerization technology, for example hydrogen. Furthermore, it is possible to concomitantly use inert solvents such as toluene or hexane, inert gas such as nitrogen or argon and relatively small amounts of polypropylene powder. The random propylene copolymers of the present invention preferably have molecular weights (weight average) of from 20,000 to 500,000. Their melt flow indices at 230° C. and under a load of 2.16 kg in accordance with DIN 53 735 are in the range from 0.1 to 100 g/10 min, in particular in the range from 0.5 to 50 g/10 min.

In comparison with random propylene copolymers known hitherto, the random propylene copolymers of the present invention are notable, in particular, for reduced amounts of xylene-soluble material, ie. they have an improved stereospecificity and a higher stiffness. The productivity of the process used for preparing these random propylene copolymers is significantly increased in comparison with the known processes.

Owing to their good mechanical properties, the random propylene copolymers of the present invention are particularly suitable for the production of films, fibers and moldings.

EXAMPLES 1 TO 3 AND COMPARATIVE EXAMPLES A TO C

Example 1 a) Preparation of the titanium-containing solid component (1)

In a first stage, finely divided silica gel ($SiO_2$) having a particle diameter of from 20 to 45 μm, a pore volume of 1.5 $cm^3$/g and a specific surface area of 260 $m^2$/g was admixed with a solution of n-butyloctylmagnesium in n-heptane, with 0.3 mol of the magnesium compound being used per mole of $SiO_2$. The finely divided silica gel additionally had a mean particle size of the primary particles of 3–5 μm and voids and channels having a diameter of 3–5 μm, with the macroscopic proportion by volume of the voids and channels based on the total particle being about 15%. The mixture was stirred for about 45 minutes at 95° C., then cooled to 20° C., after which 10 times the molar amount, based on the organomagnesium compound, of hydrogen chloride was passed in. After 60 minutes, the reaction product was admixed while stirring continually with 3 mol of ethanol per mole of magnesium. This mixture was stirred for 0.5 hours at 80° C. and subsequently admixed with 7.2 mol of titanium tetrachloride and 0.5 mol of di-n-butyl phthalate, in each case based on 1 mol of magnesium. Subsequently, the mixture was stirred for 1 hour at 100° C., the solid thus obtained was filtered off and washed a number of times with ethylbenzene.

The solid product obtained in this way was extracted for 3 hours at 125° C. with a 10% strength by volume solution of titanium tetrachloride in ethylbenzene. The solid product was then separated from the extractant by filtration and washed with n-heptane until the washings contained only 0.3% by weight of titanium tetrachloride.

The titanium-containing solid component comprised 3.5% by weight of Ti 7.4% by weight of Mg 28.2% by weight of Cl.

The particle diameter was determined by Coulter Counter analysis (particle size distribution of the silica gel particles), the pore volume and the specific surface area were determined by nitrogen adsorption in accordance with DIN 66131 or by mercury porosimetry in accordance with DIN 66133. The mean particle size of the primary particles, the diameter of the voids and channels and their macroscopic proportion by volume were determined by means of scanning electron microscopy or electron probe microanalysis, in each case on particle surfaces and on particle cross sections of the silica gel.

b) Polymerization

The polymerization was carried out in a vertically stirred gas-phase reactor having a utilizable capacity of 800 l in the presence of hydrogen as molecular weight regulator at 80° C. and under a pressure of 23 bar. The reactor contained an agitated fixed bed of finely divided polymer.

A gaseous mixture of propylene and ethylene was passed into the gas-phase reactor, with the ratio of the partial pressure of propylene to that of ethylene being 78:1. Polymerization was carried out continuously at a mean residence time of 1.5 hours with the aid of the titanium-containing solid component a) described in Example 1a), using 7.5 g/h of the titanium-containing solid component a) and 450 mmol/h of triethylaluminum and 45 mmol/h of dimethoxyisobutylisopropylsilane as cocatalyst.

After the gas-phase polymerization was complete, a random propylene copolymer containing 2.6% by weight of copolymerized ethylene and having a melt flow index of 2.4 g/10 min at 230° C. and 2.16 kg (in accordance with DIN 53 735) was obtained.

Comparative Example A

Propylene and ethylene were polymerized by a method similar to Example 1 according to the present invention using the same catalyst system and the same conditions, but using a titanium-containing solid component a) made from a granular silica gel having the following properties:

| | |
|---|---|
| Particle diameter: | 20–45 μm |
| Pore volume: | 1.8 $cm^3$/g |
| Specific surface area: | 325 $m^2$/g |
| Proportion of voids and channels based on the total particle: | <1.0% |

After the gas-phase polymerization was complete, a random propylene copolymer containing 2.4% by weight of copolymerized ethylene and having a melt flow index of 2.7 g/10 min at 230° C. and 2.16 kg (in accordance with DIN 53 735) was obtained.

Example 2

The procedure of Example 1 according to the present invention was repeated, with a gaseous mixture of propylene and ethylene having a ratio of the partial pressure of propylene to that of ethylene of 35:1 being polymerized at a mean residence time of 1.5 hours.

After the gas-phase polymerization was complete, a random propylene copolymer containing 3.5% by weight of copolymerized ethylene and having a melt flow index of 1.9 g/10 min at 230° C. and 2.16 kg (in accordance with DIN 53 735) was obtained.

Comparative Example B

Propylene and ethylene were polymerized by a method similar to Example 2 according to the present invention using the same catalyst system and the same conditions, but using a titanium-containing solid component a) made from a granular silica gel having the following properties:

| Particle diameter: | 20–45 µm |
| Pore volume: | 1.8 cm$^3$/g |
| Specific surface area: | 325 m$^2$/g |
| Proportion of voids and channels based on the total particle: | <1.0% |

After the gas-phase polymerization was complete, a random propylene copolymer containing 3.4% by weight of copolymerized ethylene and having a melt flow index of 2.0 g/10 min at 230° C. and 2.16 kg (in accordance with DIN 53 735) was obtained.

Example 3

Using a method similar to Example 1 according to the present invention, a mixture of propylene, ethylene and 1-butene was polymerized in the gas-phase reactor at 70° C. and a pressure of 20 bar. The partial pressure ratio of propylene to ethylene and 1-butene was 20:1.0:0.9, the mean residence time of the reaction mixture was 1.5 hours.

After the gas-phase polymerization was complete, a random propylene copolymer containing 4.0% by weight of copolymerized ethylene and 2.1% by weight of copolymerized 1-butene was obtained. The melt flow index (HLMI) of this random propylene copolymer was 105 g/10 min at 230° C. and 21.6 kg (in accordance with DIN 53 735).

Comparative Example C

Propylene and ethylene were polymerized by a method similar to Example 2 according to the present invention using the same catalyst system and the same conditions, but using a titanium-containing solid component a) made from a granular silica gel having the following properties:

| Particle diameter: | 20–45 µm |
| Pore volume: | 1.8 cm$^3$/g |
| Specific surface area: | 325 m$^2$/g |
| Proportion of voids and channels based on the total particle: | <1.0% |

After the gas-phase polymerization was complete, a random propylene copolymer containing 3.9% by weight of copolymerized ethylene and 2.0% by weight of copolymerized 1-butene was obtained. The melt flow index (HLMI) of this random propylene copolymer was 120 g/10 min at 230° C. and 21.6 kg (in accordance with DIN 53 735).

The Table below shows, both for the Examples 1 to 3 according to the present invention and for the Comparative Examples A to C, the productivity of the catalyst system used and also the following properties of the random propylene copolymers obtained in each case: proportion of xylene-soluble material (measure of the stereospecificity of the polymer), stiffness (G modulus) and melt flow index.

TABLE

|  | Comparative Example A | Example 1 | Comparative Example B | Example 2 | Comparative Example C | Example 3 |
|---|---|---|---|---|---|---|
| Productivity [g of polymer/g of titanium-containing solid component] | 12,800 | 21,600 | 13,900 | 22,300 | 13,500 | 23,100 |
| Proportion of xylene-soluble material [% by weight] | 4.8 | 3.9 | 5.7 | 4.6 | 12.2 | 9.1 |
| G modulus [N/mm$^2$]$^{a)}$ | 510 | 570 | 370 | 435 | 300 | 360 |
| Melt flow index* [g/10 min] | 2.7 | 2.4 | 2.0 | 1.9 | 120* | 105* |

*HLMI
$^{a)}$determined in accordance with DIN 53 445

Comparison of the Examples 1 to 3 according to the present invention with the Comparative Examples A to C makes it clear that the process of the present invention has a higher productivity and leads to random propylene copolymers having an increased stereospecificity (lower proportions of xylene-soluble material) and an increased stiffness (higher G modulus).

We claim:

1. A process for preparing random propylene copolymers containing copolymerized $C_2$–$C_{10}$-alk-1-enes by copolymerizing propylene and ethylene or $C_4$–$C_{10}$-alk-1-enes in the presence of a Ziegler-Natta catalyst system comprising a titanium-containing solid component a) comprising a compound of magnesium, a halogen, silica gel as support and a carboxylic ester as electron donor compound, and also, as cocatalysts, an organoaluminum compound b) and a further electron donor compound c), where propylene and the $C_2$–$C_{10}$-alk-1-enes are polymerized with one another at from 50 to 100° C. at pressures in the range from 15 to 40 bar and mean residence times of from 0.5 to 5 hours, wherein the support used in the titanium-containing solid component is a silica gel which has a mean particle diameter of from 5 to 200 $\mu$m, a mean particle diameter of the primary particles of from 1 to 10 $\mu$m and voids or channels having a mean diameter of from 1 to 10 $\mu$m, which voids or channels have a macroscopic proportion by volume based on the total particle in the range from 5 to 20%.

2. A process as claimed in claim 1, wherein the polymerization is carried out at mean residence times of from 0.5 to 3 hours.

3. A process as claimed in claim 1, wherein ethylene is used as $C_2$–$C_{10}$-alk-1-ene.

4. A process as claimed in claim 1, wherein a mixture of ethylene and 1-butene is used as $C_2$–$C_{10}$-alk-1-ene.

* * * * *